United States Patent [19]

Kato

[11] Patent Number: 5,426,666
[45] Date of Patent: Jun. 20, 1995

[54] COMMUNICATION APPARATUS

[75] Inventor: Ichiro Kato, Tokyo, Japan

[73] Assignee: Canon Kabushiki Kaisha, Tokyo, Japan

[21] Appl. No.: 278,110

[22] Filed: Jul. 20, 1994

Related U.S. Application Data

[63] Continuation of Ser. No. 51,805, Apr. 26, 1993, abandoned, which is a continuation of Ser. No. 482,776, Feb. 21, 1990, abandoned.

[30] Foreign Application Priority Data

Feb. 21, 1989 [JP] Japan .................................. 1-42776

[51] Int. Cl.$^6$ ............................................ H04L 27/30
[52] U.S. Cl. ...................................... 375/200; 380/34; 375/211; 375/214; 370/18; 455/34.2; 455/58.2
[58] Field of Search ...................... 375/1, 3, 4; 380/34; 455/34.2, 58.2; 370/18

[56] References Cited

U.S. PATENT DOCUMENTS

| | | | |
|---|---|---|---|
| 2,731,622 | 1/1956 | Doremus et al. | 455/58.2 X |
| 3,938,156 | 2/1976 | Lundén | 455/58.2 |
| 4,013,959 | 3/1977 | Patterson | 455/58.2 |
| 4,281,413 | 7/1981 | Forrest | 455/34.2 |
| 4,352,201 | 9/1982 | Miller | 455/58.2 |
| 4,376,310 | 3/1983 | Stackhouse et al. | 455/58.2 X |
| 4,958,359 | 9/1990 | Kato | 375/1 |

Primary Examiner—Bernarr E. Gregory
Attorney, Agent, or Firm—Fitzpatrick, Cella, Harper & Scinto

[57] ABSTRACT

There is disclosed a wireless communication apparatus for constituting a multi-station communication system, capable of preventing the interference to other communications and the deterioration in the quality of channel. The apparatus has a receiving unit and a transmitting unit, and prohibits the transmission by the transmitting unit according to the magnitude of the received output of the receiving unit.

14 Claims, 8 Drawing Sheets

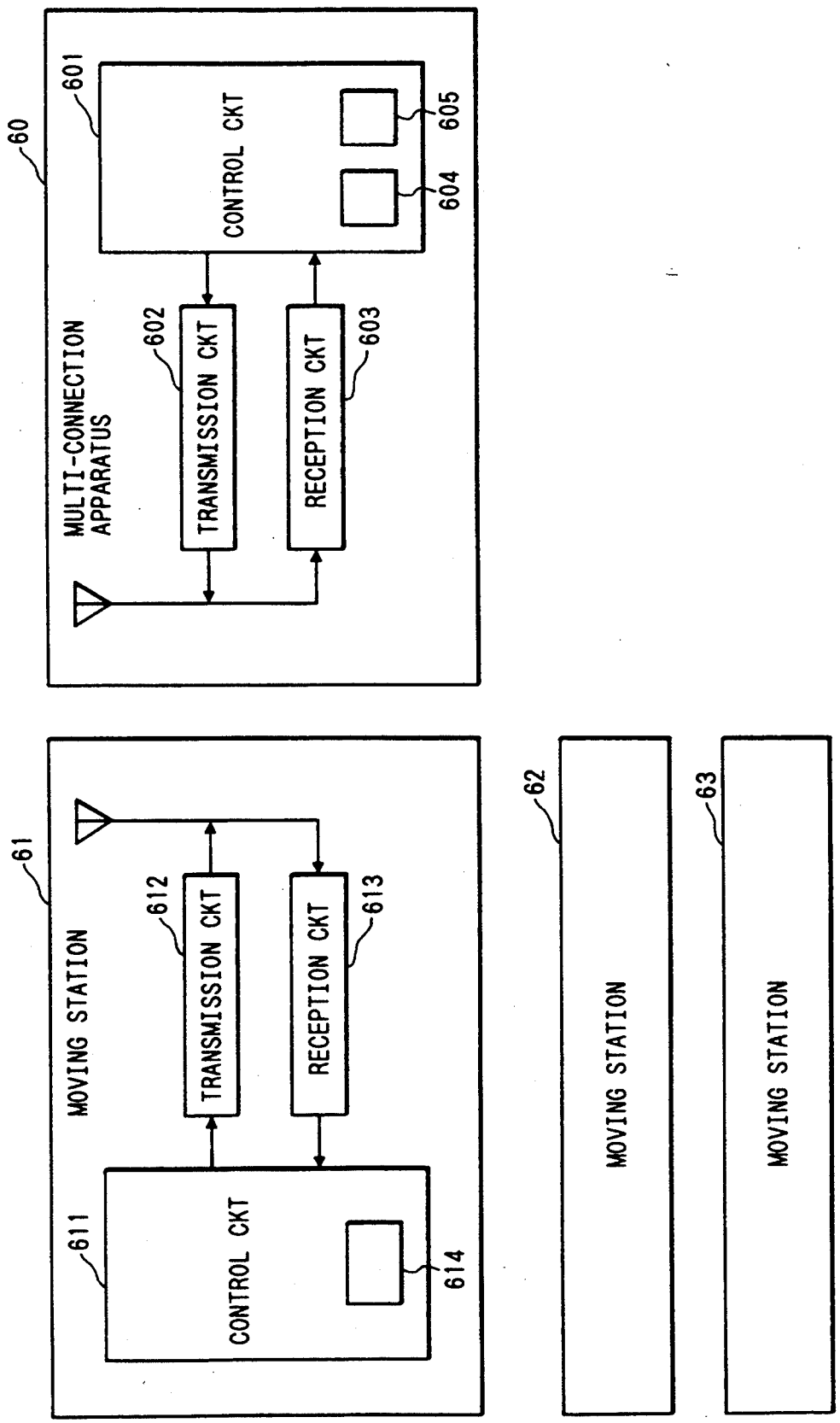

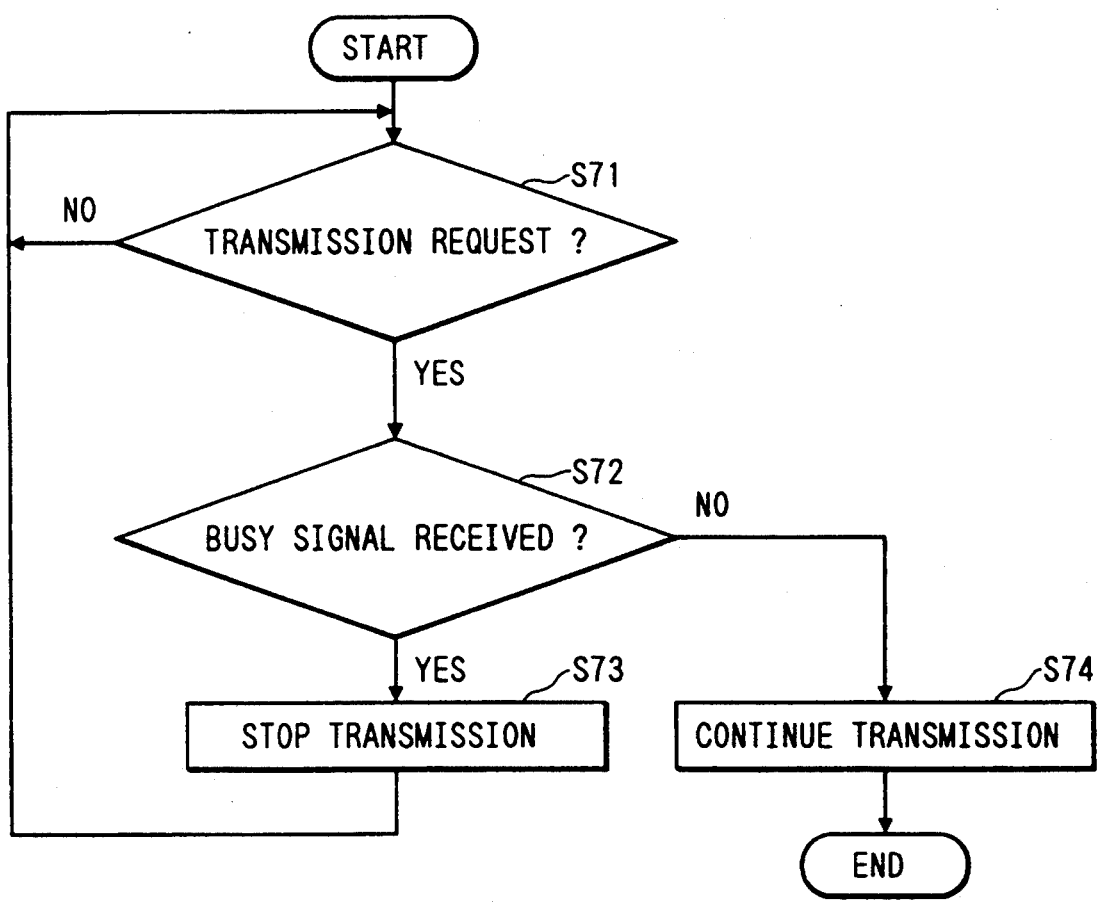

COMMUNICATION APPARATUS

This application is a continuation of application Ser. No. 08/051,805 filed Apr. 26, 1993, now abandoned, which is a continuation of application Ser. No. 07/482,776 filed Feb. 21, 1990, abandoned.

BACKGROUND OF THE INVENTION

1. Field of the Invention

The present invention relates to an apparatus for wireless communication.

2. Related Background Art

A code-divided multi-station communication system utilizing spectrum diffused communication has a feature of graceful degradation of the channel quality with the increase of the traffic. Consequently, even if the traffic in the system somewhat exceeds the design capacity of the system, the entire system can still function without sudden deterioration of the quality. Utilizing this feature, each station constituting the system is usually so constructed as to be capable of freely making connections according to the request for call in each station.

Such structure is not limited to the system with the spectrum diffused communication, but is commonly employed in other wireless communication system.

However, such conventional system has been associated with the following drawbacks because each station constituting the system is allowed to make calls freely:

(1) The deterioration of the channel quality becomes a practical problem if the quality of traffic becomes excessively high; and (2) Increase in the quantity of traffic gives rise to increase in errors due to the deterioration of the channel quality, thus inversely reducing the amount of information that can be actually communicated. Thus the throughput of the system is reduced.

SUMMARY OF THE INVENTION

An object of the present invention is to prevent disturbance on other communications.

Another object of the present invention is to prevent the deterioration in the channel quality.

Still another object of the present invention is to prevent the decrease in throughput of a wireless communication system.

Still other objects of the present invention will become fully apparent from the following description of the embodiments.

BRIEF DESCRIPTION OF THE DRAWINGS

FIG. 6 is a block diagram of a fifth embodiment of the present invention;

FIG. 7 is a flow chart of the control sequence of a movable station constituting the fifth embodiment of the present invention.

DETAILED DESCRIPTION OF THE PREFERRED EMBODIMENTS (1st embodiment)

Figure 1:
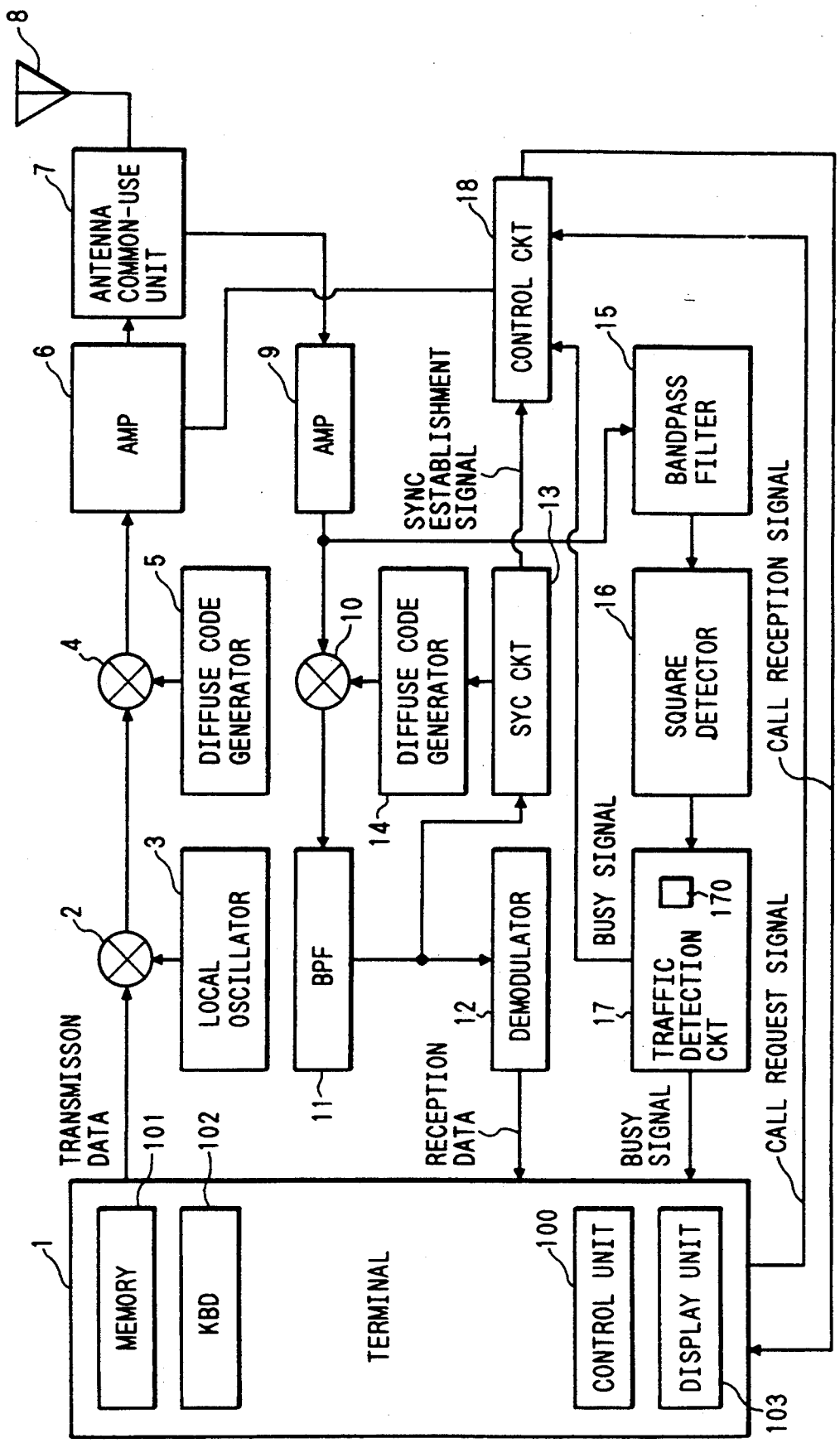
FIG. 1 is a block diagram of a first embodiment of the present invention.

FIG. 1 is a block diagram of a spectrum diffused communication apparatus constituting a multi-station connecting system embodying the present invention, wherein provided are a terminal unit 1; a mixer 2; a local oscillator 3 of a transmitting frequency; a mixer 4; a transmitting diffuse code generator 5; a transmitting amplifier 6; an antenna common-use unit 7 for using an antenna commonly in the transmission and reception; an antenna 8; a receiving amplifier 9; a mixer 10; a band-pass filter (BPF) 11 with a transmission bandwidth corresponding to the received information bandwidth; a received data demodulator 12; a diffuse code synchronization circuit 13; a receiving diffuse code generator 14; a band-pass filter 15 having a transmission bandwidth corresponding to the received diffuse bandwidth; a square detector 16; a traffic detection circuit 17 for estimating the amount of traffic in the system from the output voltage of the square detector 16; and a control circuit 18.

The terminal unit 1 is provided with a control unit 100, a memory 101, a keyboard 102, and a display unit 103. A setting circuit 170 has a predetermined voltage serving as a reference value used in discriminating whether the amount of traffic is high or low.

The present embodiment is to estimate the amount of traffic in the system, by detecting the total electric power in a frequency band utilized by the system.

The function of the spectrum diffused communication apparatus of the above-explained structure will be explained in the following.

(Stand-by state)

In a state in which the spectrum diffused communication apparatus shown in FIG. 1 is not connected to the channel, the signal received from the antenna 8 is transmitted through the common-use unit 7, amplified by the amplifier 9 and supplied to the band-pass filter 15 which extracts the components within the received diffuse signal band. Said components are converted, by the square detector 16, into a DC voltage component proportional to the electric power within said received diffuse signal band. Said DC voltage component is then compared in the traffic detection circuit with a voltage registered in advance in the setting circuit 170, and, while the former remains in excess of the latter, the traffic detection circuit 17 sends a busy signal to the control unit 100 of the terminal unit 1 and the control circuit 18. During the presence of said busy signal, the control unit 100 of the terminal unit 1 prohibits the release of a call request signal, and the control circuit 18 deactivates the amplifier 6. Consequently no new channel connection takes place in the system. Also the control unit 100 displays a busy state on the display unit 103.

More specifically, during the presence of the busy signal from the traffic detection circuit 17, the control unit 100 does not generate the call request signal, even if the operator instructs, by the keyboard 102, the transmission of the data in the memory 101.

Also the control circuit 18 sets the gain of the amplifier 6 at zero, thus prohibiting the transmission of data.

As explained above, in the present embodiment, the square detector 16 detects all the electric power in the frequency band utilized by the system, and the traffic detection circuit 17 discriminates whether the traffic in the system is excessive, based on said electric power, and the transmission is prohibited if it is excessive.

Such structure provided in each station constituting a code divided multi-station connecting system allows to maintain the total amount of traffic in the system at a predetermined level or lower, thereby ensuring the channel quality and the throughput of the entire system at a certain level or higher.

(Call making operation)

On the other hand, the terminal unit 1 can release a call request signal in a period in which the traffic detection circuit 17 does not generate the busy signal, namely while the traffic in the system is estimated not to exceed a predetermined level. Upon receiving said call request signal released by the terminal unit 1 in such state, the control circuit 18 activates the amplifier 6. The terminal unit 1 sends the transmission data from the memory 101 to the mixer 2 which mudulates said transmission data with a transmission frequency supplied from the local oscillator-3. The mixer 4 effects additional diffusion modulation by a diffuse signal supplied from the diffuse code generator 5. The output of said mixer 4 is amplified to a predetermined level by the amplifier 6, and is transmitted through the common-use unit 7 and from the antenna 8.

During the transmitting operation, the traffic detection circuit 17 does not generate the busy signal. Consequently the interruption of transmission, by sudden turning-off of the amplifier 6 in the course of transmission, can be prevented. Also the control circuit 18 may be so constructed as to disregard the busy signal during the transmission, thereby maintaining the amplifier 6 in the active state.

Also in case a communication is conducted by repating transmissions and receptions with a destination station, the traffic detection circuit 17 executes traffic detection prior to a series of transmissions and receptions, and does not repeat the traffic detection until such series is terminated. It is therefore possible to prevent the interruption of communication in the course of a series of transmissions and receptions.

The response to the call from the destination station is supplied, through the antenna 8 and the common-use unit 7, to the amplifier 9, which sends the input signal to the mixer 10 after amplification to a predetermined level. The mixer 10 executes diffuse demodulation on the input signal from the amplifier 9, utilizing the diffuse code from the diffuse code generator 14.

If the diffuse code supplied from the diffuse code generator 14 is synchronized with the diffuse code contained in the received signal, most of the electric power of the signal appears in the output of the band-pass filter 11 having a passing band width corresponding to that of the information signal. Then the signal is demodulated in the demodulator 12 and supplied to the terminal unit 1. On the other hand, if the diffuse code generated by the diffuse code generator 14 is not synchronized with that contained in the received signal, the electric power of the signal scarcely appears in the output of the band-pass filter 11. Thus, upon detecting an unsynchronized state, the synchronization circuit 13 displaces the phase of the diffuse code generated by the diffuse code generator 14 with respect to that the diffuse code contained in the received signal until a synchronized state is established.

(Reception)

A call from another station is received through the antenna 8 and the common-use unit 7, and the synchronization is established as in the response to a call. In this case the synchronization circuit 13 sends a synchronization establishment signal to the control circuit 18, which, in response, sends a call reception signal to the terminal unit 1. Also the control circuit 18 activates the amplifier 6 in order to enable response from the terminal unit 1. Thereafter the data from the terminal unit are transmitted from the antenna 8 in the same operation as in the case of call.

When the synchronization establishment signal and the busy signal are both entered, the control circuit 18 enables the transmission by the terminal unit 1, disregarding the busy signal. Thus a received call can be responded even in the busy state.

(2nd embodiment)

Figure 2:
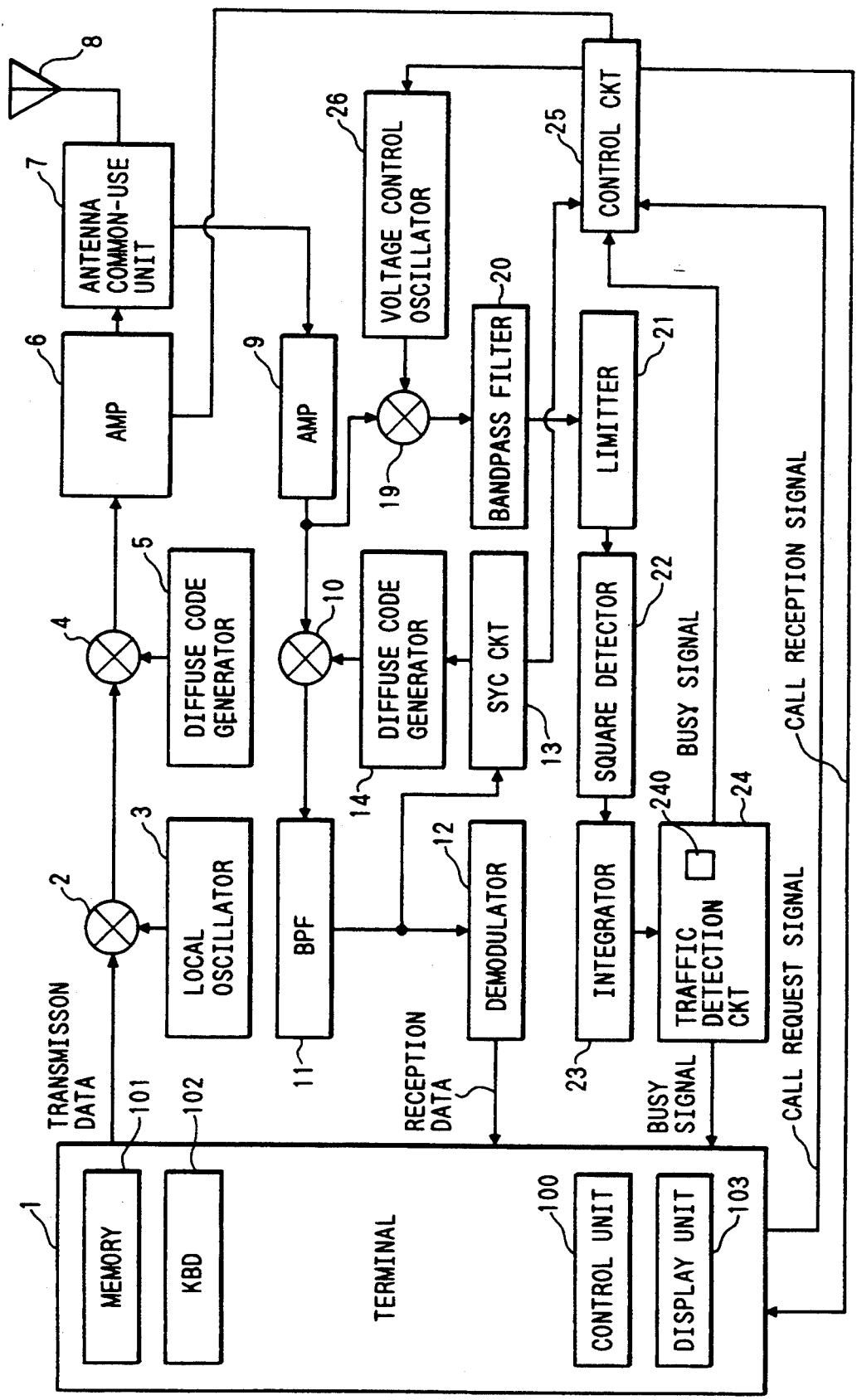
FIG. 2 is a block diagram of a second embodiment of the present invention.

FIG. 2 shows a second embodiment of the spectrum diffused communication apparatus of the present invention, constituting a multi-station connecting system.

In FIG. 2, components 1–14 and 100–103 are same as those shown in FIG. 1 and will not be explained further. There are further provided a mixer 19; a band-pass filter 20 with a passing band width sufficiently narrower than the frequency band width of the received diffuse signal; a voltage limiter 21 for limitting the voltage signal to a predetermined value; a square detector 22; an integrator 23 for integrating a DC voltage signal within a predetermined period; a traffic detection circuit 24 for estimating the amount of traffic in the system from the output voltage of the integrator 23; a control circuit 25; a voltage-controlled oscillator 26 with oscillation frequency variable according to a voltage signal received from the control circuit 25; and a setting circuit 240 for presetting a voltage corresponding to a limit traffic to be used as a reference value for evaluating the amount of traffic.

In the following there will be explained the function of the spectrum diffused communication apparatus of the above-explained structure.

In the present embodiment, the voltage detection is conducted after the elimination of influence of narrow-band interference signals by means of the mixer 19, band-pass filter 20, limiter 21 and voltage-controlled oscillator 26.

Since the functions of the components 1–4 are identical with those in the first embodiment, there will only be explained, in the following, the functions different from those in the first embodiment.

(Stand-by state)

While the channel connection is not made by the communication apparatus, the output of the amplifier 9 is multiplied, in the mixer 19, by the output of the voltage-controlled oscillator 26. The output frequency of said voltage-controlled oscillator 26 is so controlled by the control circuit 25 that the band-pass filter 20 sweeps the received diffuse signal band. The output of the band-pass filter 20, if exceeding a predetermined value, is limited by the limiter 21 to said predetermined value. Then the output of said limiter 21 is converted in the square detector 22 into a DC voltage component proportional to the electric power of said output. Subsequently the integrator 23 effects integration with a time constant corresponding to an integral multiple of the sweeping period of the voltage-controlled oscillator 26, and the obtained output is supplied to the traffic detection circuit 24, which compares the output of said integrator 23 with a predetermined voltage, and sends a busy signal to the terminal unit 1 while said output exceeds said predetermined voltage.

In constrast to the first embodiment in which the amount of traffic is estimated by converting the entire electric power of the received diffuse signal band into a voltage signal, the present embodiment effects said estimation by sweeping the received diffused signal band with a band-pass filter of a narrow band width, then converting the output of said sweeping into a voltage signal after processing in a limiter, and integrating said voltage signal.

This embodiment allows to eliminate the influence of narrow-band interference signals of a large electric power eventually present in the received diffused signal band, by means of the limiter 21 from the estimation of traffic amount, thereby enabling more exact estimation.

(3rd embodiment)

Figure 3:
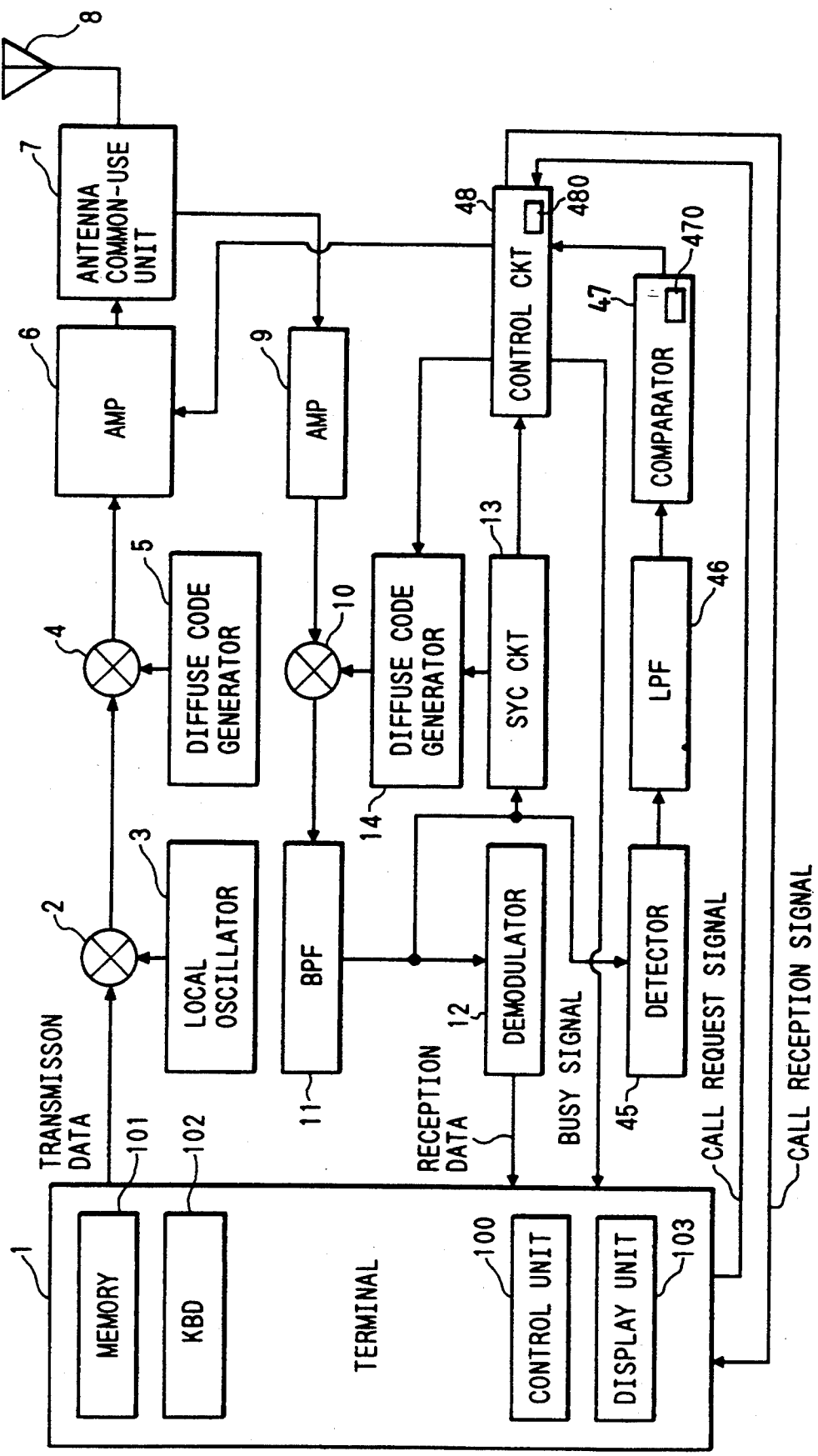
FIG. 3 is a block diagram of a third embodiment of the present invention.

FIG. 3 shows a third embodiment of the spectrum diffused communication apparatus of the present invention constituting a multi-station connecting system, wherein components 1-4 and 100-103 are same as those in FIG. 1 and will not be explained further.

The present embodiment is to discriminate whether each code channel is busy, and to estimate the amount of traffic from the number of busy code channels.

In FIG. 3 there are provided a detector 45; a low-pass filter (LPF) 46; a comparator 47 for comparing an analog base band signal released from the low-pass filter 46 with a predetermined voltage level and releasing a digital pulse when the former exceeds the latter; a control circuit 48; a setting circuit 470 for presetting a voltage corresponding to a reference electric power to be used for discriminating whether the code channel is used or not; and a memory 480 for the control circuit 48.

In the following there will be explained the function of the spectrum diffused communication apparatus of the above-explained structure.

(Stand-by state)

While the channel connection is not made by the communication apparatus, the control circuit 48 controls the diffuse code generator 14 in such a manner that it generates all the diffuse codes used in the system, and the entire apparatus effects the following operation for each diffuse code generated by the generator 14.

A signal received by the antenna 8 is transmitted by the common-use unit 7, then amplified by the amplifier 9 and supplied to the mixer 10 which also received the diffuse code generated by said generator 14. If the output signal of the amplifier 9 is synchronized with said diffuse code, a narrow-band inverse diffuse signal appears in the output of the mixer 10, is transmitted by the band-pass filter 11 and is demodulated by the demodulator 12. The output of the band-pass filter 11 is also supplied to the detector 45, which executes square detection of said output signal. Then the low-pass filter 46 eliminates unnecessary frequency components. Consequently the low-pass filter 46 provides a voltage signal proportional to the electric power of the signal of said code channel. Said voltage signal is compared, in the succeeding comparator 47, with a voltage preset by the setting circuit 470. Said comparator 47 sends a digital pulse to the control circuit 48 when said voltage signal exceeds said preset voltage. Stated differently, said code change can be estimated to be in use if the pulse appears in the output of the comparator 47.

If the output signal of the amplifier 9 is not synchronized with the diffuse code from the generator 14, the narrow-band inverse diffuse signal does not appear in the output of the mixer 10, so that the band-pass filter 11 does not provide an output signal. Consequently the synchronization circuit 13 controls the diffuse code generator 14 in such a manner that both signals become synchronized. When said code channel is not in use, said synchronization cannot, naturally, be achieved, and the control circuit 48 controls said generator 14 so as to generate a next diffuse code after the lapse of a predetermined time. In this case the comparator 47 does not generate the pulse.

The control circuit 48 stores all the diffuse codes used in the system in advance in the memory 480, and sets said diffuse codes, one by one, in succession in the generator 14, thereby discriminating whether the communication utilizing each diffuse code is conducted.

Thus the control circuit 48 executes the above-explained operation once for each of the code channels utilized in the system, and counts the number of pulses supplied from the comparator 47 within a cycle of said operations. If said count exceeds a reference value registered in advance in the memory 480 after a cycle of said operations, the control circuit 48 sends a busy signal to the terminal unit 1. On the other hand, if said count does not exceed the reference value, the control circuit terminates the busy signal to the terminal unit 1. During the entry of said busy signal to the terminal unit 1, it cannot generate the call request signal, and the control circuit 18 deactivates the amplifier 6, so that new channel connection does not occur in the system.

As explained in the foregoing, the present embodiment estimates the amount of traffic by discriminating whether each channel is in use, through inverse diffusion in each channel, and can eliminate the influence of noises in such traffic estimation.

The present embodiment executes the discrimination of the state of use on all the code channels, but it is also possible to estimate the amount of traffic in the entire system by effecting the discrimination in certain channels selected from said code channels.

The operations of transmission and reception are same as those in the first embodiment and will not, therefore, be explained in detail.

(4th embodiment)

Figure 4:
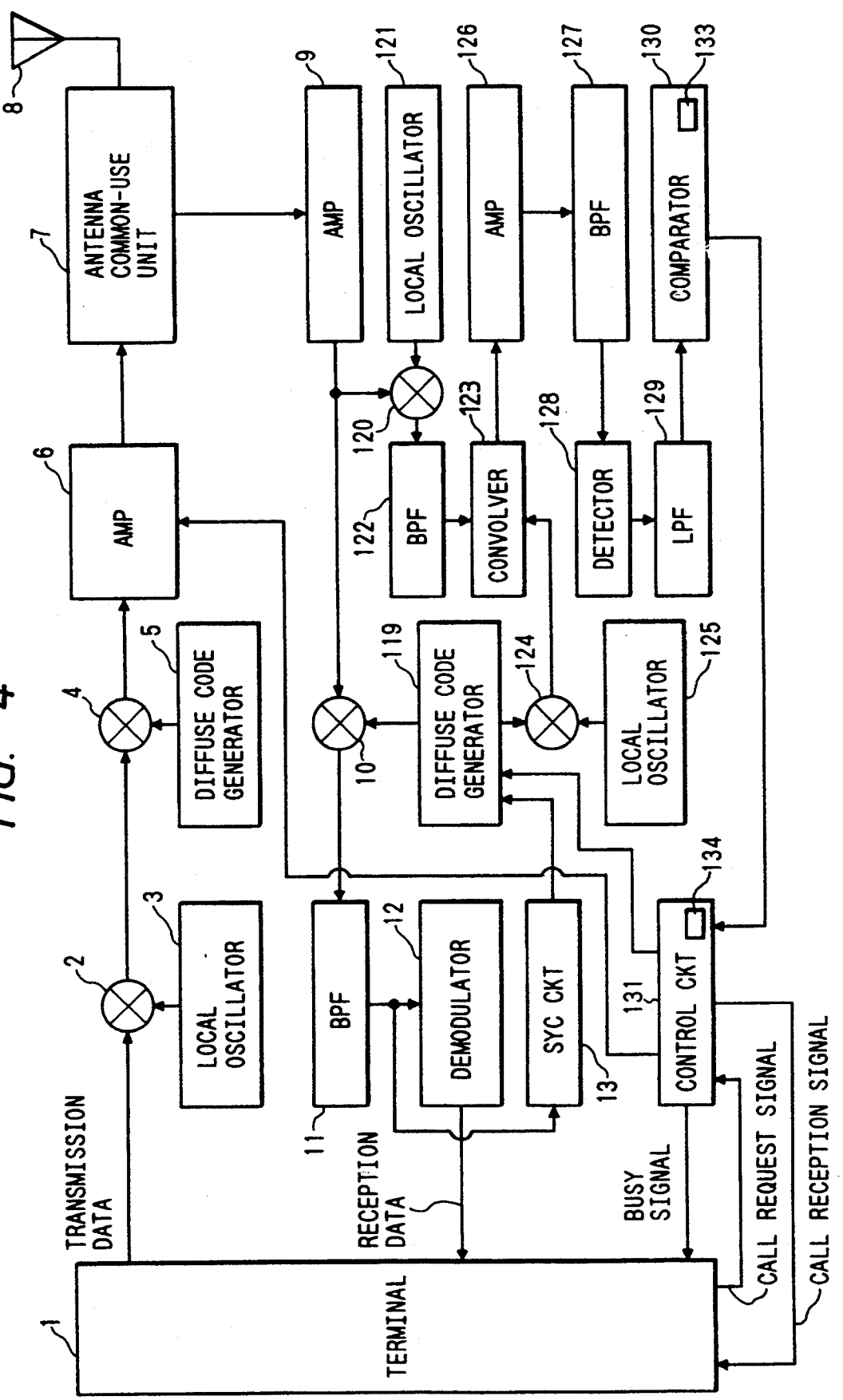
FIG. 4 is a block diagram of a fourth embodiment of the present invention.

FIG. 4 shows a fourth embodiment of the spectrum diffused communication apparatus of the present invention, constituting a multi-station connecting system, wherein components 1-12 are same as those in the first embodiment shown in FIG. 1 and will not be explained in detail. There are further provided a diffuse code generator 119 for supplying mixers 10, 124 respectively with diffuse codes for demodulating inverse diffusion and diffuse codes as reference signals of a convolver; a mixer 120; a local oscillator 121 for generating a carrier wave of a frequency equal to the difference between the central frequency of the received signal and the input central frequency of the convolver; a band-pass filter (BPF) 122 with a passing band width equal to the received diffuse signal band; a convolver 123 for effecting a convolution integration on two input signals within a suitable period; a mixer 124; a local oscillator 125 for generating the input central frequency of the convolver 125; an amplifier 126 for amplifying the output of the convolver 123 to a predetermined level; a band pass filter 127 for eliminating signals of unnecessary frequency band from the output of the amplifier 126; a detector 128; a low-pass filter 129 for eliminating signals of unnecessary frequency band from the output of the detector 128; a comparator 130 for comparing an analog base band signal released from the low-pass filter 129 with a voltage level preset in a setting circuit 133 and releasing a digital pulse when the former exceeds said voltage level; a control circuit 131; and a memory 134.

In the following there will be explained the function of the spectrum diffused communication apparatus of the above-explained structure.

Since the functions of the components 1–12 are same as those in the first embodiment, there will only be explained the operations different from those in the first embodiment.

(Stand-by state)

While the channel connection is not made by the communication apparatus, the control circuit 131 so controls the diffuse code generator 119 as to send, to the mixer 124, signals in which all the diffuse codes used in the system are inverted in the time axis. The entire apparatus executes the following operation for each of the signals obtained by inverting, in time axis, the diffuse codes generated by the diffuse code generator 119.

The output of the amplifier 9 is supplied to the mixer 120, which multiplies said output by the output of the local oscillator 121, thereby obtaining a signal with a central frequency equal to the input central frequency of the convolver 123. Said signal is subjected to the elimination of the unnecessary frequency components in the band-pass filter 122, and is supplied to the convolver 123. On the other hand, the diffuse code generator 119 sends, to the mixer 124, signals obtained by inverting, on the time axis, the diffuse codes for inverse diffusion (namely periodical signals supplied from the generator 119 to the mixer 10). The mixer 124 multiplies said time-inverted signal by the output of the local oscillator 125, thereby obtaining a signal with a central frequency equal to the input central frequency of the convolver 123. Said convolver 123 executes the convolution integration of two input signals, and sends the obtained result to the amplifier 126. Since one of the input signals to said convolver 123 is time-inverted diffuse signals, said convolution integration is equivalent to a correlation integration for the diffuse signal. Thus the output of the convolver 123 can be considered to represent the correlation between the diffuse signal generated by the diffuse code generator 119 and the received signal.

Figure 5A:
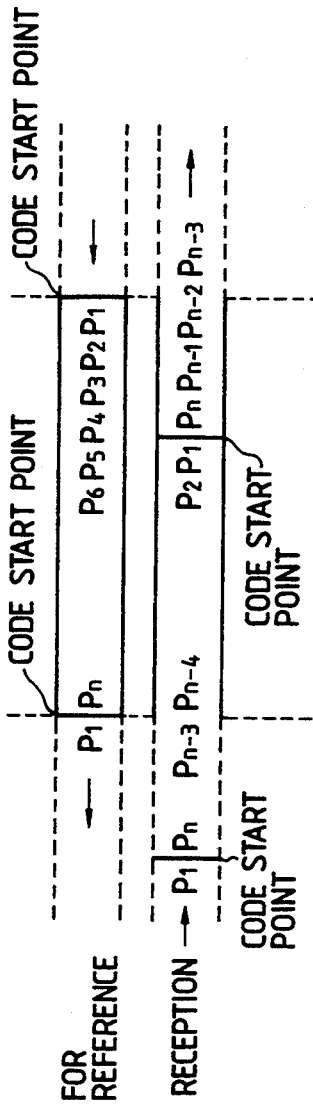
FIGS. 5A to 5C are charts showing detection of synchronization with a convolver.
Figure 5B:
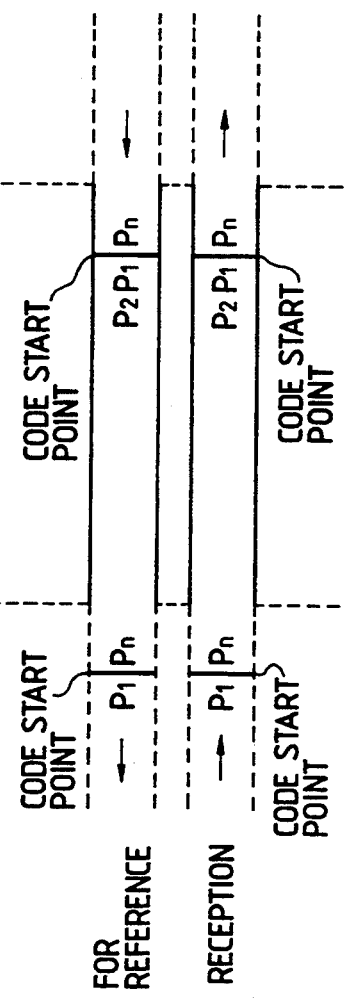
Figure 5C:
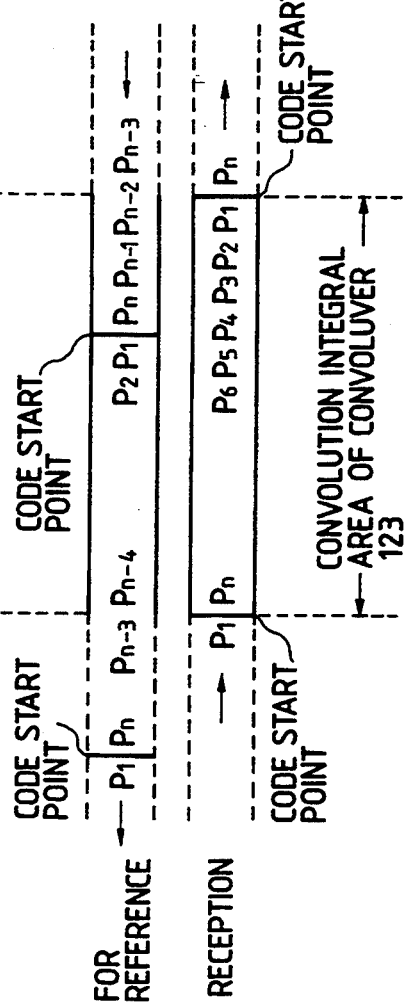

FIG. 5 shows the outline of the convolution integration by the convolver 123. In FIG. 5B, the convolver 123 detects the synchronization of two input signals and generates a pulse. The above-mentioned correlation value is amplified to a predetermined level by the amplifier 126, then subjected to the elimination of unnecessary frequency components in the band-pass filter 127, and is sent to the detector 128. Said detector 128 executes square detection on the input signal, and the low-pass filter 129 extracts desired frequency components only. In the output of the low-pass filter 129, there appears a pulse-shaped voltage signal proportional to the electric power of the signal in said code channel. Said voltage signal is compared with a voltage preset in the setting circuit 133 by means of the comparator 130, which releases a digital pulse when said voltage signal exceeds said preset voltage. Thus a code channel is estimated to be in use when a pulse appears in the output of the comparator 130.

The control circuit 131 executes the above-explained operation once for each of the code channels used in the system, and counts the number of pulses supplied from the comparator 130 within a cycle of said operation. If said count exceeds a reference value registered in advance in the memory 134 after a cycle of said operation, the control circuit 131 sends a busy signal to the terminal unit 1. On the other hand, if said count does not exceed the reference value, the control circuit terminates the busy signal to the terminal unit 1.

The subsequent operations are same as those in the first embodiment.

In comparison with the third embodiment, the present embodiment has the advantage of completing the one cycle of operations extremely quickly, since the synchronizing operations for detecting the presence of signal in each of all the code channels can be dispensed with.

(5th embodiment)

The foregoing 1st to 4th embodiments showed the structure of a daughter (movable) station adapted for use in a system, in which plural daughter (movable) stations effect multi-station connection by code division to a multi-station connecting apparatus (mother station). Thus the traffic amount is controlled by the movable station.

In contrast, in the present 5th embodiment, the traffic amount is controlled by the mother station.

In the multi-station connecting system, all the communications among the daughter stations are conducted through the mother station. Consequently the mother station can know the amount of traffic. Thus, upon receiving a request for call from a daughter station, the mother station discriminates whether the amount of traffic exceeds a predetermined level, and, if it exceeds said predetermined level, the mother station sends a busy signal back to the calling station. On the other hand, if the amount of traffic does not exceed said predetermined level, the mother station transfers the data sent from the calling station to a daughter station designated by the calling station. In case the busy signal is received, the calling station discontinues the communication.

This embodiment will be explained in more detail with reference to the attached drawings.

FIG. 6 is a schematic view of a multi-station connecting system, wherein shown are a multi-station connecting apparatus 60; a control circuit 601; a transmission circuit 602 for transmitting input data by spectrum diffusion; a reception circuit 603 for reproducing the transmission data by inverse diffusion of the received signal; a counter 604; a memory 605; a movable station 61; a control circuit 611; a transmission circuit 612 for transmitting input data by spectrum diffusion; a reception circuit 613 for reproducing the transmission data by inverse diffusion of received signal; and a memory 614. 62 and 63 indicate other movable stations same as the station 61.

Figure 8:
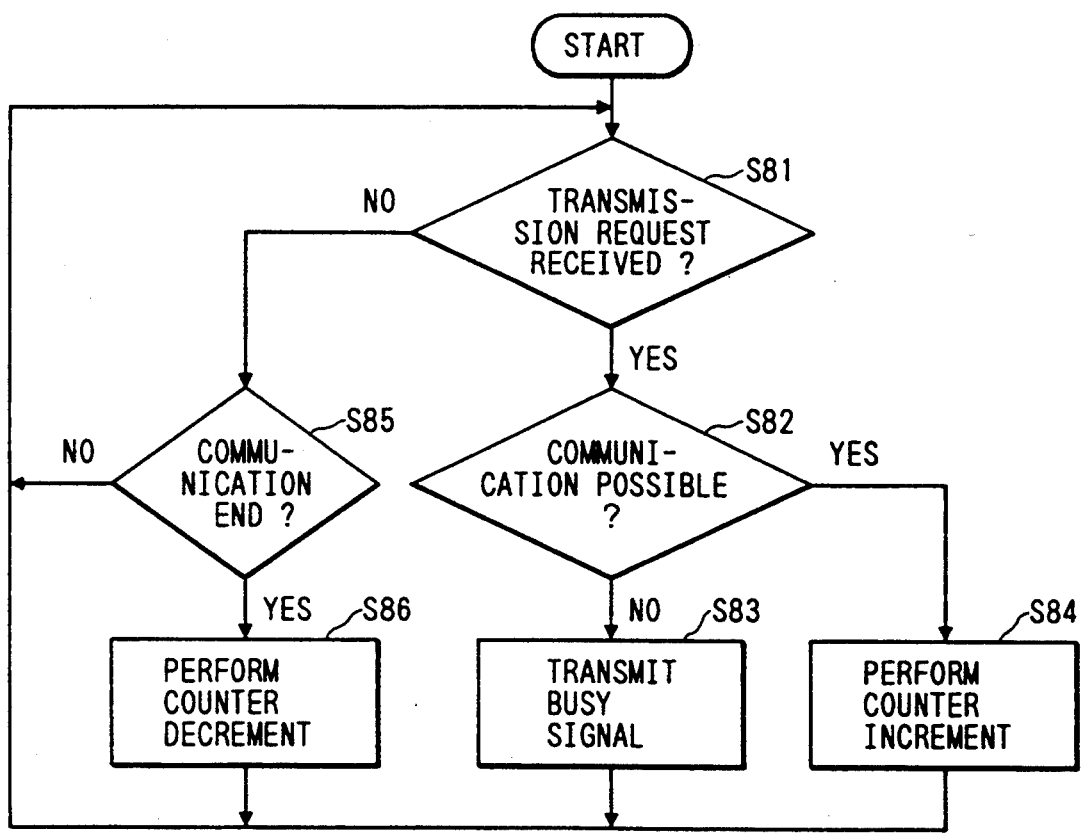
FIG. 8 is a flow chart of the control sequence of a multi-station connecting apparatus of the fifth embodiment of the present invention.

Flow charts of the functions of the movable station and the multi-station connecting apparatus are shown in FIGS. 7 and 8.

When a communication is desired from the movable station 61 to 62, the station 61 sends a request for connection to the multi-station connecting apparatus 60 (step S71). Said request is sent by spectrum diffusion, by a diffuse code specific to the station 61, of a connection request code, and identification codes of the station 61 itself and the destination station 62.

The control circuit 601 of the multi-station connecting apparatus 60 discriminates whether the received data are a request for transmission, by inverse diffusion, in the reception circuit 603, of the received data with an inverse diffuse code (step S81). Said inverse diffusion is conducted on all the inverse diffuse codes for all the movable stations constituting the system. In case a request for transmission is identified, there is conducted comparison of the values of the counter 604 and the memory 605 (step S82), which respectively represent the amount of current traffic and the limit amount of traffic. If the value of said counter 604 is equal to or exceeds that of the memory 605, the control circuit 601 causes the transmission circuit 602 to supply the requesting movable station 61 with a busy signal, diffused by a diffuse code corresponding to said station 61 (step S83). On the other hand, if the value of the counter 604 is less than that of the memory 605, the control circuit 601 executes a step increment of the value of the counter 604 (step S84). Then the data transmitted from the movable station 61 are subjected to inverse diffusion by the reception circuit 603, diffused by the diffuse code for the movable station 62 in the transmission circuit 602, and transferred to said movable station 62.

Upon detecting the completion of communication between the movable stations 61 and 62 by monitoring said communication (step S86), the control circuit 601 executes a step decrement of the counter 604. In this manner the multi-station connecting apparatus 60 can maintain the amount of current traffic in the counter 604. Consequently the multi-station connecting apparatus 60 can limit the amount of traffic in concentrated manner, and the detection of traffic amount in each movable station is no longer necessary.

Upon receiving the busy signal (step S72), the control circuit 611 of the movable station 61 interrupts the transmission procedure by the transmission circuit 612 (step S73). On the other hand, the transmission is continued if the busy signal is not received (step S74).

The present invention is not limited to the spectrum diffused communication, but is applicable to ordinary wireless communications.

The foregoing 1st to 5th embodiments of the present invention allow to control the amount of traffic, prevent the deterioration in channel quality and prevent the loss in the system through-put resulting from increased communication errors, by enabling or prohibiting the communication according to the amount of traffic.

The present invention has been explained by preferred embodiments thereof, but it is not limited to such embodiments and is subjected to various modifications and applications within the scope and spirit of the appended claims.

What is claimed is:

1. A spread spectrum communication apparatus comprising:
reception means for receiving a first signal;
transmission means for transmitting a second signal by spread spectrum communication; and
blocking means for blocking the transmission of the second signal by said transmission means through any one of plural spread spectrum channels according to the amplitude of an output of said reception means for each of the plural spread spectrum channels.

2. A communication apparatus according to claim 1, wherein said blocking means blocks the transmission of the second signal by said transmission means, in case the first signal received by said reception means is larger than a predetermined value.

3. A communication apparatus according to claim 1, wherein said reception means generates a correlation between the received first signal and a reference code.

4. A communication apparatus according to claim 3, wherein said blocking means blocks the transmission of the second signal by said transmission means according to the amplitude of the correlation output of said reception means for each of the spread spectrum channel reference codes.

5. An apparatus according to claim 1, wherein said reception means receives the first signal via an antenna and said transmission means transmits the second signal via the antenna.

6. An interconnection communication station for mediating spread spectrum communication among plural stations, comprising:
determining means for determining a number of stations in spread spectrum communication by counting the number of stations which sent a request for spread spectrum communication; and
response means for responding to a request for spread spectrum communication from a station, according to a result of a determination by said determining means.

7. An interconnection communication station according to claim 6, wherein said response means releases a response of refusal to the request for spread spectrum communication from the station, when said determining means judges that the number of stations in spread spectrum communication is larger than a predetermined number.

8. A spread spectrum communication apparatus comprising:
reception means for receiving a spread spectrum signal and for outputting a correlation between the received spread spectrum signal and plural reference codes;
determining means for determining an amount of spread spectrum communication traffic, according to a correlation output from said reception means for each of the plural references codes; and
blocking means for blocking execution of a new spread spectrum communication, according to a result of a determination by said determining means.

9. A spread spectrum communication apparatus according to claim 8, wherein said determining means determines the amount of spread spectrum traffic, according to the amplitude of the correlation output from said reception means for each of plural reference codes.

10. An apparatus according to claim 8, wherein said reception means comprises an antenna.

11. A spread spectrum communication apparatus comprising:
reception means for receiving a first signal;

transmission means for transmitting a second signal by spread spectrum communication; and blocking means for blocking the transmission of the second signal by said transmission means when the amplitude of the first signal received by said reception means within a spread bandwidth is greater than a predetermined value, wherein said blocking means comprises a band-pass filter having a transmission bandwidth corresponding to the spread bandwidth.

12. An apparatus according to claim 11, wherein said reception means receives the first signal via an antenna and said transmission means transmits the second signal via the antenna.

13. A spread spectrum communication apparatus comprising:

reception means for receiving a first signal;

transmission means for transmitting a second signal by spread spectrum communication; and blocking means for blocking the transmission of the second signal by said transmission means when the amplitude of the first signal received by said reception means within a spread bandwidth is greater than a predetermined value, wherein said blocking means comprises sweeping means for sweeping the first signal within the spread bandwidth and limiting means for limiting an output of said sweeping means.

14. An apparatus according to claim 13, wherein said reception means receives the first signal via an antenna and said transmission means transmits the second signal via the antenna.

* * * * *

UNITED STATES PATENT AND TRADEMARK OFFICE
CERTIFICATE OF CORRECTION

PATENT NO. : 5,426,666
DATED : June 20, 1995
INVENTOR(S) : ICHIRO KATO

It is certified that error appears in the above-indentified patent and that said Letters Patent is hereby corrected as shown below:

IN THE DRAWINGS

Sheet 2 of 8, FIG. 2, "LIMITTER" should read --LIMITER--.
　　Sheet 5 of 8, FIG. 5C, "CONVOLUVER" should read
　　　　　　　　　　　--CONVOLVER--.

COLUMN 1

Line 26, "system." should read --systems.--.

COLUMN 2

Line 61, "Also" should read --Also,--.

COLUMN 3

Line 27, "oscillator-3." should read --oscillator 3.--.
　　Line 41, "repat-" should read --repeat- --.

COLUMN 4

Line 13, "Also" should read --Also,--.
　　Line 15, "Thereafter" should read --Thereafter,--.
　　Line 17, "of" should read --of a--.
　　Line 33, "limitting" should read --limiting--.

COLUMN 5

Line 3, "quently" should read --quently,--.
　　Line 44, "following" should read --following,--.
　　Line 67, "quently" should read --quently,--.

UNITED STATES PATENT AND TRADEMARK OFFICE
CERTIFICATE OF CORRECTION

PATENT NO. : 5,426,666
DATED : June 20, 1995
INVENTOR(S) : ICHIRO KATO

It is certified that error appears in the above-indentified patent and that said Letters Patent is hereby corrected as shown below:

COLUMN 6

Line 6, "change" should read --channel--.
Line 12, "Consequently" should read --Consequently,--.

COLUMN 8

Line 40, "Consequently" should read --Consequently,--.

COLUMN 9

Line 39, "manner" should read --manner,--.
Line 41, "Consequently" should read --Consequently,--.

Signed and Sealed this

Twenty-sixth Day of December, 1995

Attest:

BRUCE LEHMAN

*Attesting Officer*      *Commissioner of Patents and Trademarks*